No. 821,083. PATENTED MAY 22, 1906.
E. R. BROOKBANK.
SULKY CULTIVATOR.
APPLICATION FILED JULY 17, 1905.

4 SHEETS—SHEET 1.

Witnesses.
E. G. Hannant.
John Buechner

Inventor.
Edward R. Brookbank.
By Victor E. Randall
Atty.

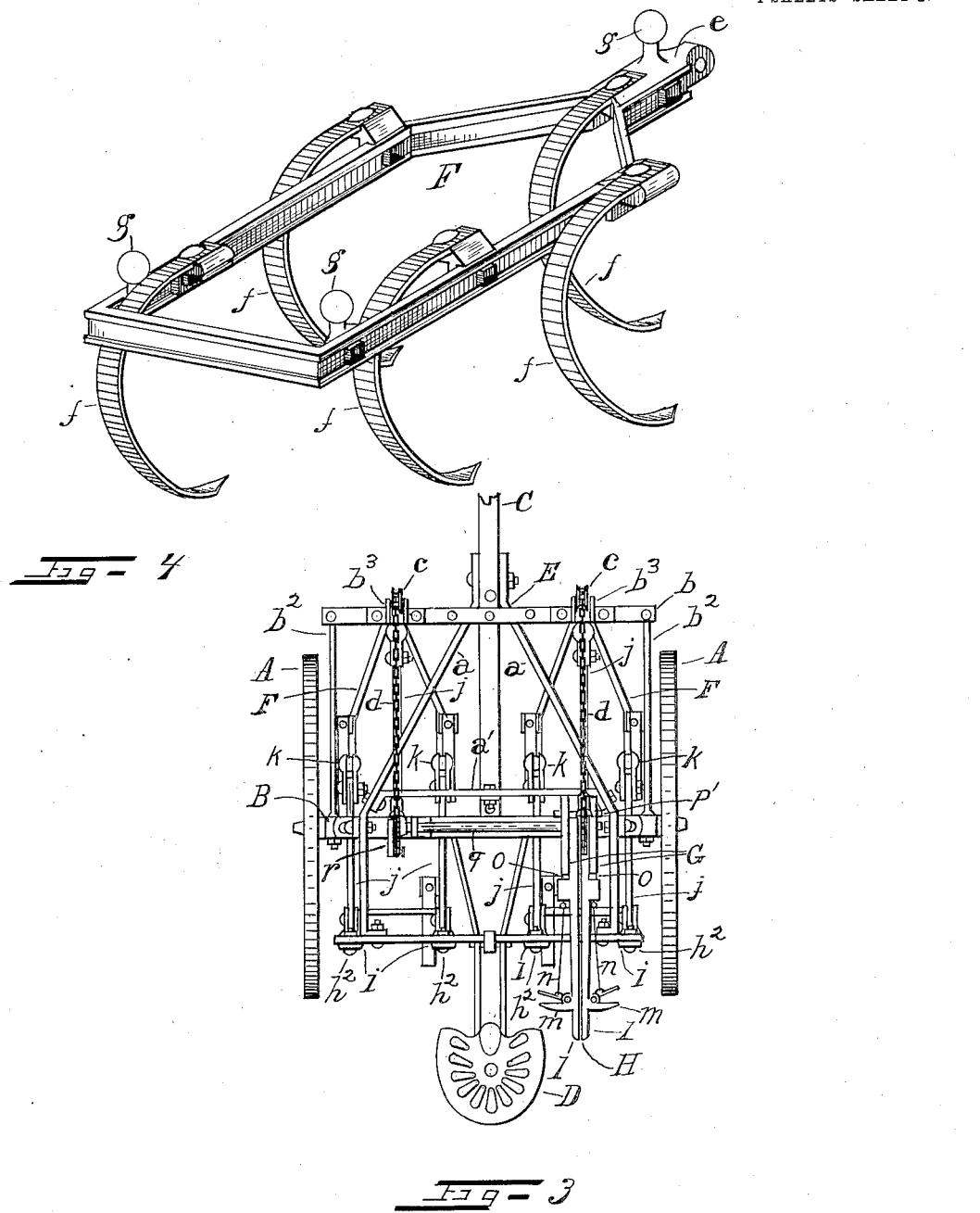

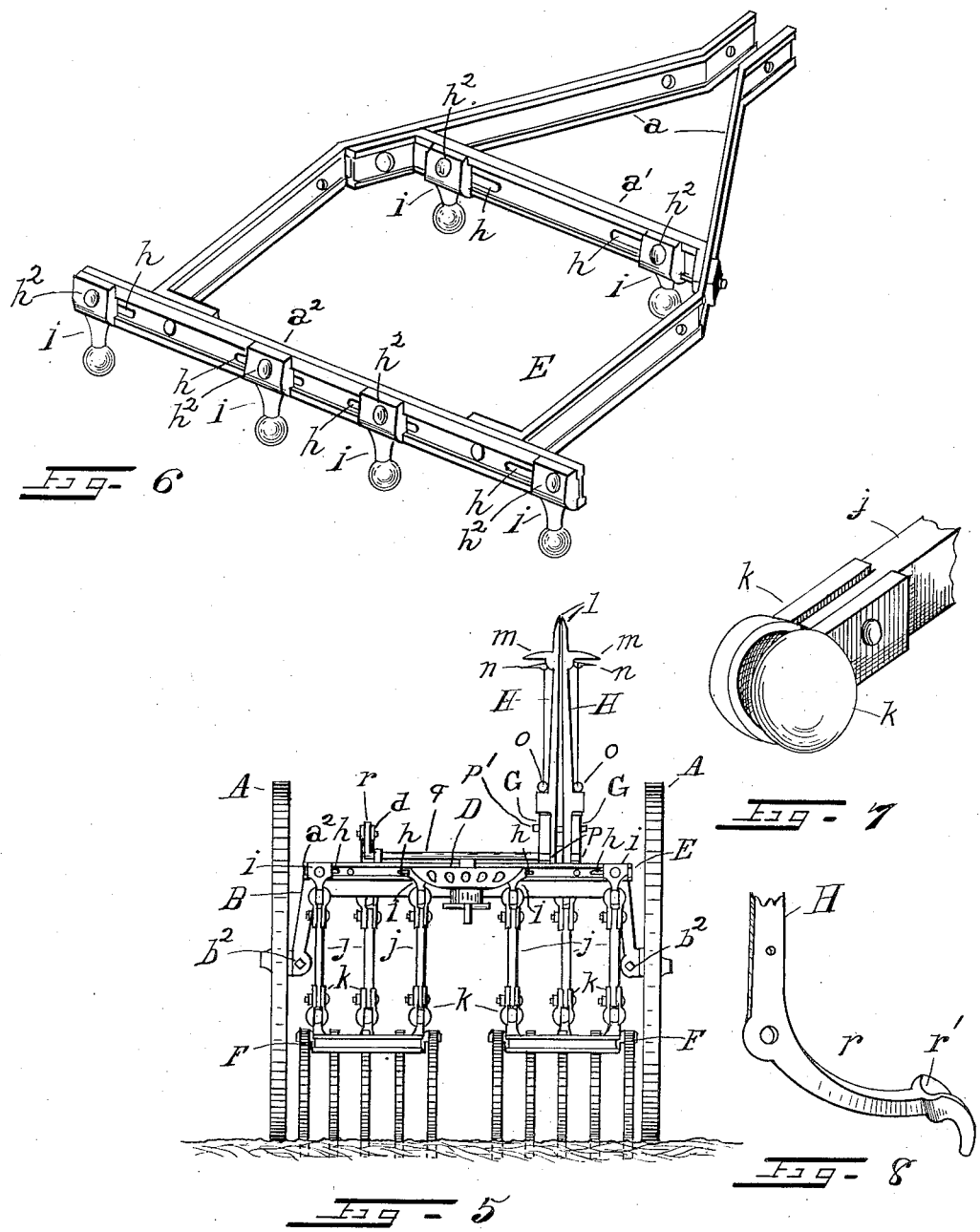

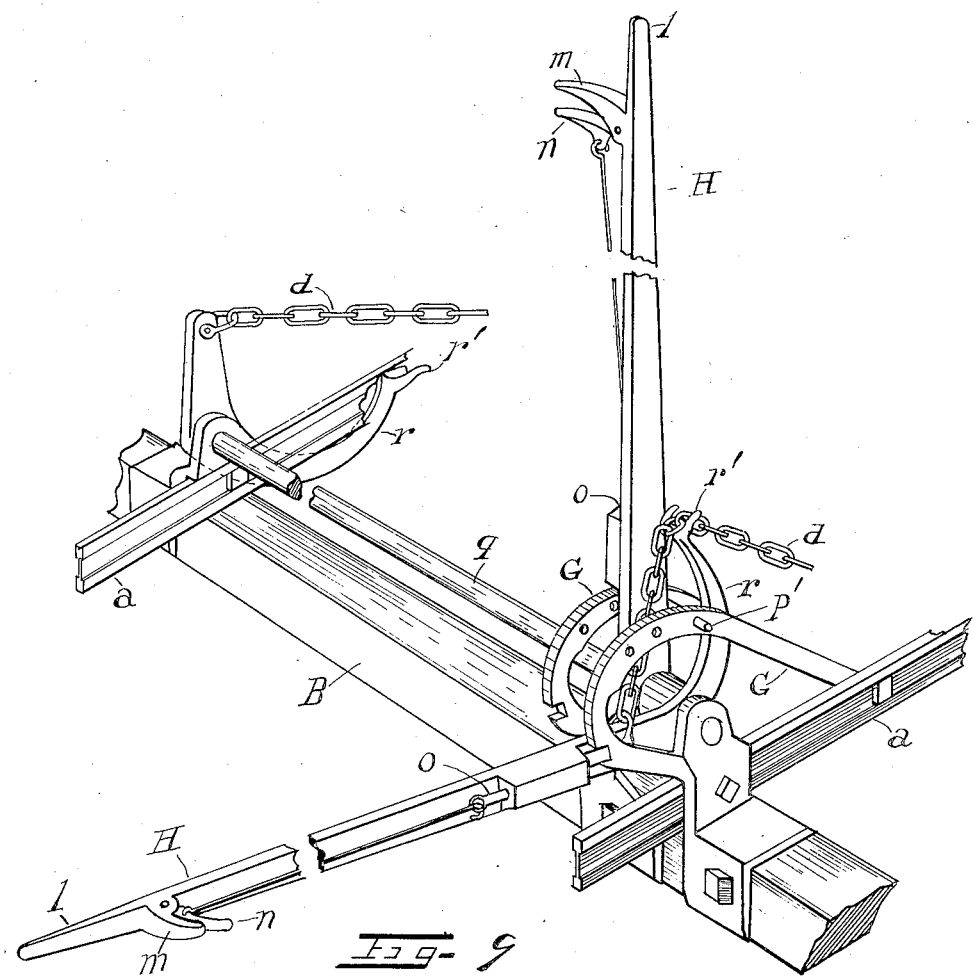

UNITED STATES PATENT OFFICE.

EDWARD R. BROOKBANK, OF BATTLE CREEK, MICHIGAN.

SULKY-CULTIVATOR.

No. 821,083.      Specification of Letters Patent.      Patented May 22, 1906.

Application filed July 17, 1905. Serial No. 270,150.

*To all whom it may concern:*

Be it known that I, EDWARD R. BROOKBANK, a citizen of the United States, residing at Battle Creek, in the county of Calhoun and State of Michigan, have invented certain new and useful Improvements in Sulky-Cultivators; and I do hereby declare the following to be a full, clear, and exact description of the invention, such as will enable others skilled in the art to which it appertains to make and use the same, reference being had to the accompanying drawings, and to the marks of reference placed thereon, which form a part of this specification.

This invention relates to cultivators; and its object is to construct a wheel-cultivator in such manner that the individual gangs may be readily raised or lowered individually or collectively, as may be desired, and by the use of but one hand; whereby the gangs will under all conditions remain in a parallel position with the soil cultivated whether swung laterally or raised and lowered, or, in other words, its shovels will keep the same plane, so that all teeth will exercise the same propensities for cultivating; whereby the weight of the gangs will counterbalance the operator when lifted from the soil; whereby the shovels will have a tendency of lead to cause the same to enter the soil whether sharp or dull; whereby the shovels will be released from their tendency to draw within the soil when the motive power is reversed; whereby the gangs may be raised very high to clear obstructions; whereby the shovels or teeth of the respective gangs will be forward of the operator and within a point of observation at all times; whereby the framework will be very compact, simple, and rigid.

Other objects and advantages will hereinafter appear from the following specification and will be particularly pointed out in the claims hereto appended.

It has been customary heretofore to construct wheel-cultivators, whether provided with shovels that enter the soil on the same plane or having their gangs lift from a pivot, in such manner that when motion is imparted to the same the teeth will lift and draw from the soil, and specially so if the ground is hard or the teeth have become blunt and dull by use. My invention overcomes these disadvantages, as will appear from the following specification, wherein—

Figure 1:
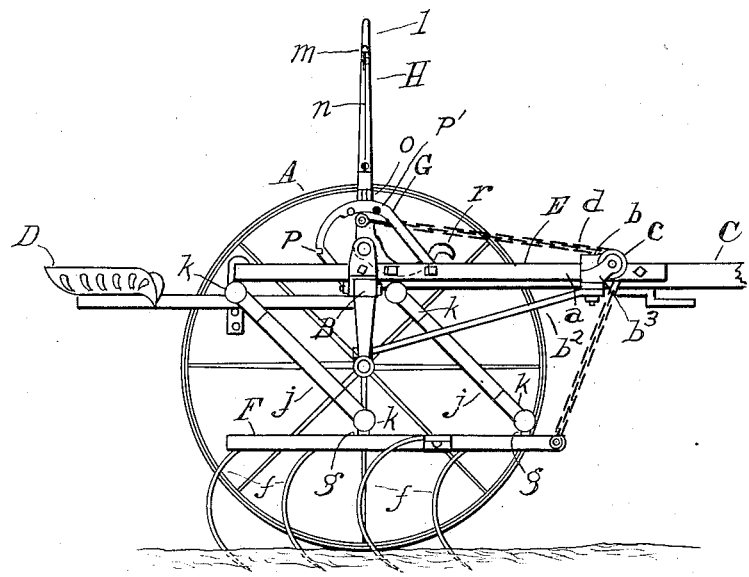
Figure 2:
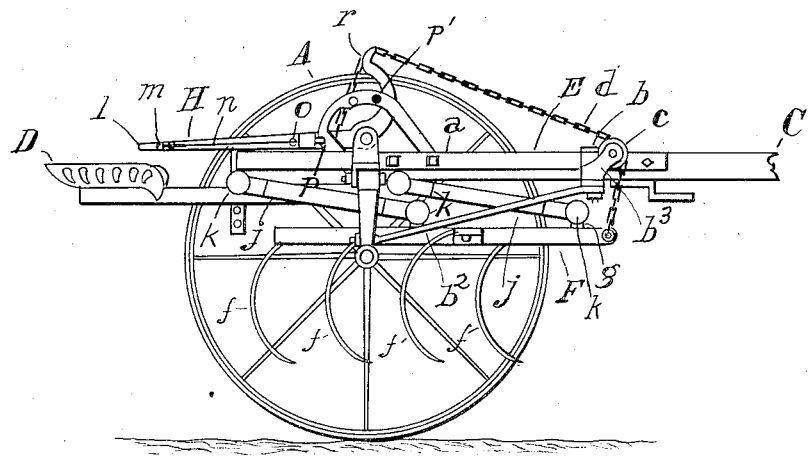

Figure 1 represents a side view with one wheel removed and the gangs lowered. Fig. 2 is a side view with one wheel removed and shows the gangs elevated. Fig. 3 is a plan view with the gangs elevated. Fig. 4 is a perspective view of a gang. Fig. 5 is a rear view of the cultivator with the gangs lowered. Fig. 6 is a perspective view of the frame from which the gangs are supported. Fig. 7 is a detail of a hanger-box. Fig. 8 is a detail view of a lifting-lever; and Fig. 9 is a perspective view of the lifting-levers, the lever to the right being down in the mode of lifting one of the gangs.

Like marks of reference refer to corresponding parts throughout the several views.

A represents the wheels; B, the usual upwardly-curved axle; C, the tongue; D, the seat; E, an A-shaped main frame having a transverse rear cross-piece; F F, the shovel-gangs; G G, the quadrants, and H H the adjusting-levers.

Secured to the axle B, and preferably at the upper side thereof, as shown, I attach the main frame E. This frame, by preference, is constructed from I-beam in cross-section, and its contour is A-shaped, as shown. It comprises the side bars $a$ $a$, central transverse cross-piece $a'$, and rear cross-bar $a^2$, the latter of which extends slightly beyond the side pieces. Between the forward ends of this frame the tongue C is fitted and, as herein shown, extends to and is attached to the axle and the cross-piece $a'$. Crossing the tongue at a point near the forward end of the main frame a cross-bar $b$ is bolted, and from the ends of this bar side braces $b^2$ extend and are secured to the axle ends. Revoluble in brackets $b^3$, bolted to the bar $b$, grooved rollers $c$ are mounted, and over these rollers chains $d$ pass from the lifting-levers to the forward ends of the shovel-gangs, as shown in Figs. 1 and 2. As will be observed, these chains are attached to the gangs F at their forward ends and on their respective frames in such manner that they draw the gangs, the inclination of the hangers $j$ being such that the shovels or teeth will enter the soil, even though very blunt and dull. These gang-frames may be made in any desired form requisite to the purpose and, as herein shown, comprise a rectangular rear portion having an indrawn forward portion between which a bracket $e$ is fitted. This bracket to the forward end forms an eyelet for attaching the lift-chain $d$, a socket for fitting a shovel or spring-tooth $f$, and an upwardly-extending ball $g$ for receiving the cup-box of a hanger hereinafter set forth.

Within the transverse bars $a'$ and $a^2$ of the main frame longitudinal slots $h$ are formed, the bar $a'$ having two, the bar $a^2$ having four, the slots being arranged in such manner that the gang-supporting brackets $i$ may be shifted to the right or to the left, as occasion may require in the adjustment of the shovel-gangs, and better comprehended in Fig. 6, the individual brackets being secured in place by bolts $h^2$, also a similar set of ball-brackets being attached to the gang-frames and designated as $g$.

$j$ represents hangers, to either end of which cup-shaped boxes $k$ are bolted, each box comprising two pieces, as shown. The upper ends of the hangers are attached to the ball-brackets $i$, their lower ends to the ball-brackets $g$. By preference three hangers are employed on each gang, as shown—one at the forward end and two at or near the rear extremity of the respective gangs. It would be obvious, however, that four hangers could be employed to answer the purpose, providing they were arranged in parallel groups, two being forward and two at or near the rear extremity of said gangs, and it is preferable that the hangers be of equal length, or approximately so. The parallel arrangement of the hangers and their connection with the main frame and cultivator-gangs by ball-and-socket boxes or journals permit the gangs to be swung laterally in the same plane with the soil, as well as forward and back, in such manner that every shovel or tooth will cultivate without the rearward teeth following or trailing others, as is the case where culivator-gangs are pivoted from forwardly-fixed supports and swung laterally from such pivots in circular motion or where gangs are collapsed or swung together on pivotal connections from a central draw-bar.

That the gangs may be adjusted either individually or collectively, I provide a series of levers H H, arranged at one side of the driver's seat. These levers are operated from the same axis, the lever to the left operating the rod or axle $q$, the lever to the right operating on an extremity of said axle to the right. (Better comprehended in Fig. 9.) The free extremities $l$ of the levers lie very closely together when in a normal position and may be grasped in union when it is desired to elevate the gangs simultaneously. Each lever has a vertical hand-grip $l$ and a right-angular hand-grip $m$, below which is fitted the usual latch $n$ and spring-adjusting dog $o$, the latter of which is adapted to engage a slot $p$ near the base of the quadrant G to secure the shovel-gangs in an elevated position, an adjustable pin $p'$ passing through holes near the rearward pitch of the quadrants, acting as a bar, preventing the levers from passing a predetermined point. The lever to the left is attached to a rod $q$, having a crank $r$, to which the left-hand shovel-gang is attached through the medium of a lifting-chain $d$. The lever to the right has a curved extension $r'$, this extension and the crank $r$ being identical in shape. The chain in the latter case is pivoted directly to the lever, as shown, the chains in both instances being attached very closely to the pivot of the respective levers. From these pivots the chains are trained over the grooved rollers $c$ at the forward side of the cultivator-frame and connect with the forward ends of the respective gangs F, so that when a lever has been brought downward to raise the respective shovel-gangs the curved extremity of the lever will strike the chain in such manner as will accelerate the movement of the same and lift the gang speedily and high. The first movement of the chains is slow and of short purchase for the purpose of affording the operative sufficient leverage to lift the shovels from the soil.

From the foregoing description, taken in connection with the drawings, it will be seen that I have not only devised a cultivator of excedingly simple design, but one also with many advantages.

It will be apparent that various changes in minor details of construction could be resorted to without departing from the spirit or sacrificing any of the advantages of my improvements, and I hold myself as entitled to such changes as would be compatible with my invention.

Having, therefore, described my invention, what I claim as new, and desire to secure by Letters Patent, is—

1. In a cultivator, the combination with the main frame, of shovel-gangs, suspended therefrom by forwardly-inclined parallel-arranged hangers from pivotal journals capable of retaining said gangs in the same plane when raised, lowered, or laterally disposed, each gang being provided with triple hangers, one at the forward end and two at or near the rear extremity of the respective gangs, levers to raise or lower said gangs, grooved rollers mounted at the forward end of said frame and chains trained over said rollers and connected at their ends with said levers and gangs, respectively, substantially as, and for the purpose set forth.

2. In a cultivator, the combination with the main frame, of shovel-gangs suspended therefrom by forwardly-inclined parallel-arranged hangers having ball-and-socket joints both at their connection with the main frame and also with the respective gangs, so that when the gangs are raised, lowered, or laterally disposed, the gangs will retain the same plane, levers to raise or lower said gangs, grooved rollers mounted at the forward end of said frame and chains trained over said rollers and connected at their ends with said levers and the forward ends of said gangs respectively, substantially as, and for the purpose set forth.

3. In a cultivator, the combination with the axle and tongue, of a frame comprising oppositely-disposed, angular side pieces meeting the tongue at their forward ends and spread at their rear extremities, a cross-piece intersecting said side pieces forward of the axle and a cross-piece secured to the extremities of said side pieces extending beyond their ends at the rear of the axle, longitudinal slots within said cross-pieces, and hanger-brackets bolted to said cross-pieces at the intersection of said slots, substantially as, and for the purpose set forth.

4. In a cultivator, the combination with the main frame, of a cross-piece forward of the axle, a cross-piece to the rear of the axle, longitudinal slots in said cross-pieces, hanger-brackets bolted to said cross-pieces at the intersection of said slots, parallel-arranged hangers suspended from said brackets in a forwardly-inclined position, shovel-gangs suspended from said hangers, a cross-piece attached to the forward end of the frame, grooved rollers mounted on said cross-piece, chains passing over said rollers and connectively united to the forward end of said gangs, their opposite ends being attached to adjusting-levers, substantially as, and for the purpose set forth.

5. In a cultivator, a quadrant mounted thereon, a lever pivotally operative from said quadrant, of a curved extension to said lever terminating in a fork, a lift-chain pivoted near the axis or pivot of said lever and passing over a grooved roller at the forward end of the cultivator and attached to the forward end of a shovel-gang, the pivotal connection of the chain with the lever acting as a leverage to start the shovel-gang from the soil, the curved extension acting to accelerate the movement of the shovel-gang when the chain is engaged therewith, substantially as, and for the purpose set forth.

EDWARD R. BROOKBANK.

Witnesses:
 GEO. J. SHARPS,
 H. F. WINGATE.